United States Patent
Fukumoto et al.

(10) Patent No.: US 12,374,693 B2
(45) Date of Patent: Jul. 29, 2025

(54) ELECTRODE SLURRY CARBON NANOTUBE LIQUID DISPERSION, NEGATIVE ELECTRODE SLURRY, NON-AQUEOUS ELECTROLYTE SECONDARY BATTERY, AND METHOD FOR PRODUCING ELECTRODE SLURRY CARBON NANOTUBE LIQUID DISPERSION

(71) Applicant: Panasonic Intellectual Property Management Co., Ltd., Kadoma (JP)

(72) Inventors: Yusuke Fukumoto, Osaka (JP); Nobuhiro Hirano, Hyogo (JP); Masanori Sugimori, Osaka (JP); Yuji Yokoyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/267,304

(22) PCT Filed: Nov. 26, 2021

(86) PCT No.: PCT/JP2021/043314
§ 371 (c)(1),
(2) Date: Jun. 14, 2023

(87) PCT Pub. No.: WO2022/137977
PCT Pub. Date: Jun. 30, 2022

(65) Prior Publication Data
US 2024/0055613 A1    Feb. 15, 2024

(30) Foreign Application Priority Data
Dec. 23, 2020    (JP) ................ 2020-213616

(51) Int. Cl.
*C09D 5/24* (2006.01)
*C01B 32/174* (2017.01)
(Continued)

(52) U.S. Cl.
CPC .......... *H01M 4/625* (2013.01); *C01B 32/174* (2017.08); *C09D 5/24* (2013.01); *C09D 7/61* (2018.01);
(Continued)

(58) Field of Classification Search
CPC ...... H01M 4/625; H01M 4/133; H01M 4/134; H01M 4/364; H01M 4/386; H01M 4/587;
(Continued)

(56) References Cited

U.S. PATENT DOCUMENTS

2017/0062827 A1\* 3/2017 Bruckmeier .......... H01M 4/622
2018/0226650 A1    8/2018 Yoo et al.
(Continued)

FOREIGN PATENT DOCUMENTS

JP    2016-139548 A    8/2016
JP    6633654 B2    1/2020
(Continued)

OTHER PUBLICATIONS

International Search Report dated Jan. 25, 2022, issued in counterpart International Application No. PCT/JP2021/043314 (4 pages).
(Continued)

*Primary Examiner* — Mark Kopec
*Assistant Examiner* — Jaison P Thomas
(74) *Attorney, Agent, or Firm* — WHDA, LLP

(57) ABSTRACT

Provided is an electrode slurry carbon nanotube liquid dispersion which improves charge/discharge cycle characteristics. An electrode slurry carbon nanotube liquid dispersion which is one aspect of the present disclosure and contains 0.1-1.5 mass % of carbon nanotubes, a dispersion
(Continued)

medium, and carboxymethyl cellulose, the viscosity of which at $100s^{-1}$ in a 3% aqueous solution is 2-200 mPa·s, wherein: the carboxymethyl cellulose content constitutes 50-250 parts by mass relative to 100 parts by mass of carbon nanotubes; the viscosity at $100s^{-1}$ is 50-200 mPa·s in a state in which the carbon nanotubes are dispersed; and the particle distribution according to the laser diffraction method exhibits a D10 of 0.3-1.0 µm, a D50 of 3-10 µm and a D90 of 60 µm or less in a state in which the carbon nanotubes are dispersed.

5 Claims, 1 Drawing Sheet

(51) Int. Cl.
  *C09D 7/61* (2018.01)
  *C09D 101/28* (2006.01)
  *H01M 4/133* (2010.01)
  *H01M 4/134* (2010.01)
  *H01M 4/36* (2006.01)
  *H01M 4/38* (2006.01)
  *H01M 4/587* (2010.01)
  *H01M 4/62* (2006.01)

(52) U.S. Cl.
  CPC ........ *C09D 101/286* (2013.01); *H01M 4/133* (2013.01); *H01M 4/134* (2013.01); *H01M 4/364* (2013.01); *H01M 4/386* (2013.01); *H01M 4/587* (2013.01); *C01B 2202/22* (2013.01); *C01B 2202/28* (2013.01); *C01P 2004/53* (2013.01); *C01P 2004/61* (2013.01); *C01P 2004/62* (2013.01); *C01P 2006/22* (2013.01)

(58) Field of Classification Search
  CPC ............. H01M 4/0404; H01M 4/1393; H01M 4/1395; H01M 4/62; H01M 4/622; H01M 10/0525; H01M 4/13; C01B 32/174; C01B 2202/22; C01B 2202/28; C09D 5/24; C09D 7/61; C09D 101/286; C01P 2004/53; C01P 2004/61; C01P 2004/62; C01P 2006/22; Y02E 60/10
  See application file for complete search history.

(56) References Cited

U.S. PATENT DOCUMENTS

| | | | |
|---|---|---|---|
| 2018/0312404 A1* | 11/2018 | Karagiannidis | C01B 32/19 |
| 2020/0227750 A1* | 7/2020 | Woo | H01M 4/583 |
| 2020/0369522 A1* | 11/2020 | Finlayson | H01M 4/621 |
| 2023/0242402 A1* | 8/2023 | Morita | C01B 32/16 |
| | | | 423/445 R |

FOREIGN PATENT DOCUMENTS

| | | |
|---|---|---|
| JP | 2020-189770 A | 11/2020 |
| JP | 2021-057560 A | 4/2021 |
| JP | 2021-527295 A | 10/2021 |
| JP | 2022-014871 A | 1/2022 |
| WO | 2014/077252 A1 | 5/2014 |
| WO | 2019/226902 A1 | 11/2019 |
| WO | 2022/070810 A1 | 4/2022 |
| WO | WO-2024095843 A1 * | 5/2024 |

OTHER PUBLICATIONS

Walocel™ C, USP/EP Carboxymethyl Cellulose Sodium for Pharmaceutical Applications, Pharma & Food Solutions, (2014). 8 pages.

Food & Nutrition, Walocel™ C, Sodium Carboxymethylcellulose, The Ideal Hydrocolloid for Dairy Applications, (Dow Chemical) 2013. 40 pages.

Information Submission Statement dated Oct. 21, 2024, issued in counterpart JP Application No. 2022-572002, with English translation. (13 pages).

Walocel CTM CMC, Carboxymethyl Cellulose for Industrial Applications, Du Pont. ( 8 pages); cited in Information Submission Statement dated Oct. 21, 2024.

Information Submission Statement dated Mar. 7, 2025, issued in counterpart JP Application No. 2022-572002, with English translation. (49 pages).

Product Safety Assessment, DOW (TW) Carboxymethylcellulose (CMC) Ethers (the Dow Chemical Company, Feb. 19, 2010), p. 1-6.(18 pages); cited in Information Submission Statement dated Mar. 7, 2025.

* cited by examiner

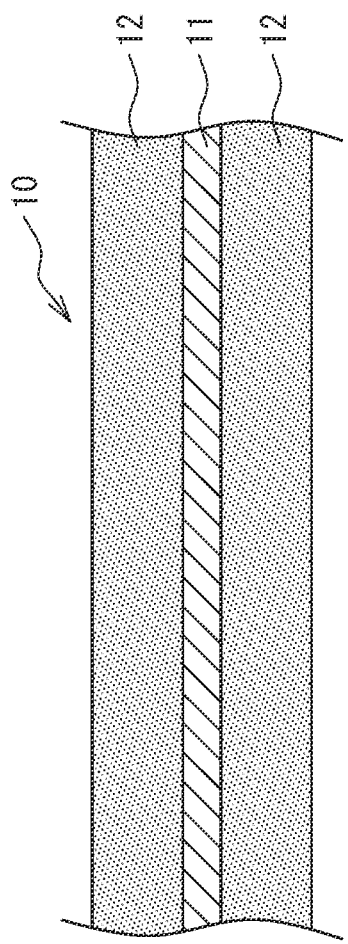

ELECTRODE SLURRY CARBON NANOTUBE LIQUID DISPERSION, NEGATIVE ELECTRODE SLURRY, NON-AQUEOUS ELECTROLYTE SECONDARY BATTERY, AND METHOD FOR PRODUCING ELECTRODE SLURRY CARBON NANOTUBE LIQUID DISPERSION

CROSS REFERENCE TO RELATED APPLICATIONS

This Application is the National Stage of International Application No. PCT/JP2021/043314, filed on Nov. 26, 2021, which claims priority from Application No. 2020-213616 filed on Dec. 23, 2020 in Japan. The entire contents of these applications are incorporated herein by reference in their entirety.

TECHNICAL FIELD

The present disclosure generally relates to a dispersion of carbon nanotubes for an electrode slurry, a negative electrode slurry, a non-aqueous electrolyte secondary battery, and a method for manufacturing a dispersion of carbon nanotubes for an electrode slurry.

BACKGROUND ART

As a conductive agent included in an electrode of a non-aqueous electrolyte secondary battery, carbon nanotubes have attracted attention. The carbon nanotubes may remarkably improve conductivity at a low addition amount compared with conventional conductive agents such as acetylene black. However, the carbon nanotubes have a problem of dispersibility due to their easy aggregation.

Patent Literature 1 discloses a dispersion of carbon nanotubes for an electrode slurry including predetermined amounts of carbon nanotubes and partially hydrogenated nitrile rubber in a dispersion medium, wherein the carbon nanotubes have a specified dispersion particle size. Patent Literature 1 describes that a secondary battery including a positive electrode and a negative electrode produced by using this dispersion of carbon nanotubes for an electrode slurry may reduce a direct-current internal resistance (DCIR).

CITATION LIST

Patent Literature

PATENT LITERATURE 1: Japanese Patent No. 6633654

SUMMARY

Technical Problem

The present inventors have found that a viscosity becomes a significantly important factor for improving the dispersibility of carbon nanotubes in the dispersion of carbon nanotubes for an electrode slurry. The art described in Patent Literature 1 does not consider a viscosity of the dispersion of carbon nanotubes for an electrode slurry, and still has room for improvement. By improving the dispersibility of the carbon nanotubes in the dispersion of carbon nanotubes for an electrode slurry to produce an electrode having a uniform mixture layer, deterioration in a battery capacity due to repeated charge and discharge may be inhibited in a secondary battery using this electrode.

It is an advantage of the present disclosure to provide a dispersion of carbon nanotubes for an electrode slurry that improves charge-discharge cycle characteristics.

Solution to Problem

A dispersion of carbon nanotubes for an electrode slurry of an aspect of the present disclosure includes: greater than or equal to 0.1 mass % and less than or equal to 1.5 mass % of carbon nanotubes; a dispersion medium; and a carboxymethylcellulose in which a 3% aqueous solution thereof has a viscosity at $100 \text{ s}^{-1}$ of greater than or equal to 2 mPa·s and less than or equal to 200 mPa·s, wherein a content of the carboxymethylcellulose is greater than or equal to 50 parts by mass and less than or equal to 250 parts by mass relative to 100 parts by mass of the carbon nanotubes, in a state of dispersing the carbon nanotubes, a viscosity at $100 \text{ s}^{-1}$ is greater than or equal to 50 mPa·s and less than or equal to 200 mPa·s, and in a state of dispersing the carbon nanotubes, a particle size distribution by a laser diffraction method has a D10 of greater than or equal to 0.3 μm and less than or equal to 1.0 μm, a D50 of greater than or equal to 3 μm and less than or equal to 10 μm, and a D90 of less than or equal to 60 μm.

A negative electrode slurry of an embodiment of the present disclosure includes: the above dispersion of carbon nanotubes for an electrode slurry; a carbon-based negative electrode active material; and a Si-based negative electrode active material.

A non-aqueous electrolyte secondary battery of an embodiment of the present disclosure comprises a negative electrode produced by using the above negative electrode slurry.

A method for manufacturing a dispersion of carbon nanotubes for an electrode slurry of an embodiment of the present disclosure includes: a mixing step of mixing greater than or equal to 0.1 mass % and less than or equal to 1.5 mass % of carbon nanotubes, a dispersion medium, and a carboxymethylcellulose in which a 3% aqueous solution thereof has a viscosity at $100 \text{ s}^{-1}$ of greater than or equal to 2 mPa·s and less than or equal to 200 mPa·s to produce a mixture liquid; and a dispersing step of dispersing the carbon nanotubes included in the mixture liquid, wherein a high-pressure homogenizer is used in the dispersing step.

Advantageous Effect of Invention

Using the dispersion of carbon nanotubes for an electrode slurry according to the present disclosure may improve the charge-discharge cycle characteristics of the battery.

BRIEF DESCRIPTION OF DRAWING

FIG. 1 is a sectional view of an electrode produced by using an electrode slurry including a dispersion of carbon nanotubes for an electrode slurry of an example of an embodiment.

DESCRIPTION OF EMBODIMENTS

The present inventors have made intensive investigation, and consequently found that using a dispersion of carbon nanotubes for an electrode slurry containing: carbon nanotubes (CNTs) having a predetermined particle size distribution; and a carboxymethylcellulose (CMC) in which a 3% aqueous solution thereof has a viscosity at 100 s$^{-1}$ of greater than or equal to 2 mPa·s and less than or equal to 200 mPa·s at a certain ratio improves a capacity retention of a battery. It is presumed that forming a mixture layer by using the dispersion of carbon nanotubes for an electrode slurry including the carbon nanotubes with improved dispersibility increases uniformity of the mixture layer to improve the charge-discharge cycle characteristics of the battery. The CMC in which a 3% aqueous solution thereof has a viscosity at 100 s$^{-1}$ of greater than or equal to 2 mPa·s and less than or equal to 200 mPa·s has a low molecular weight. This may increase the number of molecules in the dispersion of carbon nanotubes for an electrode slurry compared with a case where a CMC having a large molecular weight is added at the same amount in the dispersion, and thereby a nano material such as the CNTs may be effectively dispersed. The present inventors have also found that, in a method for manufacturing the dispersion of carbon nanotubes for an electrode slurry, using a high-pressure homogenizer may efficiently disperse the CNTs compared with a case of using other apparatuses.

Hereinafter, embodiments of the dispersion of carbon nanotubes for an electrode slurry, negative electrode slurry including this dispersion of carbon nanotubes for an electrode slurry, and non-aqueous electrolyte secondary battery comprising a negative electrode produced by using this negative electrode slurry, and method for manufacturing a dispersion of carbon nanotubes for an electrode slurry according to the present disclosure will be described in detail. Embodiments that will be described hereinafter are merely an example, and the present disclosure is not limited to the following embodiments. Drawings to be referred in the description of the embodiments are schematically illustrated, and size ratio of constituents illustrated in Drawings and the like should be determined with considering the following description.

[Non-Aqueous Electrolyte Secondary Battery]

A non-aqueous electrolyte secondary battery according to the present disclosure is, for example, a lithium-ion secondary battery. A battery case of the non-aqueous electrolyte secondary battery may be constituted with a metal having a circular, rectangular, or coin shape, and the like, or may be constituted with a laminate sheet including a metal layer and a resin layer. The non-aqueous electrolyte secondary battery includes, for example, an electrode assembly and a non-aqueous electrolyte in the battery case. The electrode assembly may be a wound electrode assembly in which a positive electrode and a negative electrode are wound with a separator interposed therebetween, or a stacked electrode assembly in which a plurality of positive electrodes and a plurality of negative electrodes are alternately one-by-one stacked with a separator interposed therebetween. The non-aqueous electrolyte includes a non-aqueous solvent and an electrolyte salt dissolved in the non-aqueous solvent. As the non-aqueous solvent, esters, ethers, nitriles, amides, and a mixed solvent of two or more thereof may be used, for example. The non-aqueous solvent may contain a halogen-substituted derivative in which hydrogens in these solvents are at least partially substituted with a halogen atom such as fluorine. As the electrolyte salt, a lithium salt such as LiPF$_6$ is used, for example.

FIG. 1 is a sectional view of an electrode produced by using an electrode slurry including a dispersion of carbon nanotubes for an electrode slurry of an example of an embodiment. An electrode 10 includes a core 11 and an electrode mixture layer 12 stacked on a surface of the core 11. As illustrated in FIG. 1, the electrode 10 may comprise the electrode mixture layers 12 on both surfaces of the core 11. The electrode 10 may be an elongated electrode to constitute a wound electrode assembly, or may be a rectangular electrode to constitute a stacked electrode assembly. The electrode 10 may be applied for a positive electrode, negative electrode, or both of them of the non-aqueous electrolyte secondary battery. The non-aqueous electrolyte secondary battery preferably comprises a negative electrode produced by using a negative electrode slurry including a dispersion of carbon nanotubes for an electrode slurry, described later. Although the negative electrode produced by using the negative electrode slurry including the dispersion of carbon nanotubes for an electrode slurry will be described hereinafter as an example, a positive electrode may be produced by using a positive electrode slurry including the dispersion of carbon nanotubes for an electrode slurry.

For the core 11, a metal foil, a film in which a metal layer is formed on a surface thereof, and the like may be used. A thickness of the core 11 is, for example, greater than or equal to 5 μm and less than or equal to 20 μm. In the case of the positive electrode, a metal foil containing aluminum as a main component may be used for the core 11. In the case of the negative electrode, a metal foil containing copper as a main component may be used. The main component herein means a constituent with the highest mass proportion. The core 11 may be aluminum foil with substantially 100% aluminum, or may be copper foil with substantially 100% copper.

The electrode mixture layer 12 includes, for example, an active material, carbon nanotubes (CNTs), carboxymethylcellulose (CMC), a binder, and the like. A thickness of the electrode mixture layer 12 is, for example, greater than or equal to 30 μm and less than or equal to 200 μm, and preferably greater than or equal to 50 μm and less than or equal to 150 μm. The electrode mixture layer 12 may include a carbon material such as carbon black (CB), acetylene black (AB), and Ketjenblack as a conductive agent other than the carbon nanotubes.

Examples of an active material for the positive electrode (positive electrode active material) included in the electrode mixture layer 12 include a lithium-transition metal composite oxide. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. Examples of an active material for the negative electrode (negative electrode active material) included in the electrode mixture layer 12 include: a carbon-based active material such as a natural graphite such as flake graphite, massive graphite, and amorphous graphite, and an artificial graphite such as massive artificial graphite (MAG) and graphitized mesophase carbon microbead (MCMB); and a Si-based active material that forms an alloy with lithium. Examples of the Si-based active material include: a Si-containing compound represented by $SiO_x$ (0.5≤x≤1.6) (hereinafter, referred to as SiO); or a Si-containing compound in which Si fine particles are dispersed in a lithium silicate phase, represented by $Li_{2y}SiO_{(2+y)}$ (0≤y≤2), (hereinafter, referred to as LSX). The active material is a main component of the electrode mixture layer 12. A content percentage of the active material in the electrode mixture layer 12 is preferably greater than or equal to 85 mass % and less than or equal to 99 mass %, and more preferably greater than or equal to 90 mass % and less than or equal to 99 mass %.

Examples of the carbon nanotubes (CNTs) included in the electrode mixture layer 12 include single-wall carbon nanotubes (SWCNTs) and multiwall carbon nanotubes (MWCNTs). The CNTs included in the negative electrode mixture layer are preferably SWCNTs, and may include MWCNTs. The CNTs included in the positive electrode mixture layer are preferably CNTs synthesized with a catalyst including Co, and among them, MWCNTs are preferable. The positive electrode mixture layer may include SWCNTs. SWCNTs have a diameter of greater than or equal to 0.4 nm and less than or equal to 5.0 nm, and a length of greater than or equal to 5.0 μm and less than or equal to 20 μm, for example. Here, the diameter of SWCNTs is calculated by measuring diameters of 10 CNTs using a transmission electron microscope (TEM) to average these diameters. The length of CNTs is calculated by measuring lengths of 10 CNTs using a scanning electron microscope (SEM) to average these lengths.

The carboxymethylcellulose (CMC) included in the electrode mixture layer 12 functions as a viscosity-regulating thickener in the electrode slurry, as described later. The CMC may also function as a binder. Examples of the CMC include a sodium salt of carboxymethylcellulose and an ammonium salt of carboxymethylcellulose.

Examples of the binder included in the electrode mixture layer 12 other than the CMC include a fluororesin such as polytetrafluoroethylene (PTFE), polyvinylidene fluoride (PVdF), polyacrylonitrile (PAN), a polyimide, an acrylic resin, a polyolefin, and styrene-butadiene rubber (SBR) or a modified product thereof. The positive electrode mixture layer may include, for example, PVdF. The negative electrode mixture layer may include, for example, SBR or a modified product thereof.

The electrode 10 may be produced by, for example: applying an electrode slurry including the active material, the CNTs, the CMC, the binder, and the like on the core 11; drying the coating to form the electrode mixture layer 12; and then rolling this electrode mixture layer 12.

The negative electrode slurry preferably includes a dispersion of carbon nanotubes for an electrode slurry, described later, the carbon-based negative electrode active material, and the Si-based negative electrode active material. The negative electrode slurry may further include SBR or a modified product thereof.

Next, the dispersion of carbon nanotubes for an electrode slurry of an example of an embodiment and a method for producing the dispersion will be described.

[Dispersion of Carbon Nanotubes for Electrode Slurry]

The dispersion of carbon nanotubes for an electrode slurry includes single-wall carbon nanotubes (SWCNTs), a dispersion medium, and a carboxymethylcellulose (CMC). This dispersion of carbon nanotubes for an electrode slurry contains the SWCNTs having a predetermined particle size distribution and the CMC having a predetermined viscosity at a certain ratio, as described later. This increases uniformity of the mixture layer to improve the charge-discharge cycle characteristics of the battery. The dispersion medium is, for example, water such as ion-exchanged water and distilled water.

A content percentage of the SWCNTs in the dispersion of carbon nanotubes for an electrode slurry is greater than or equal to 0.1 mass % and less than or equal to 1.5 mass %, preferably greater than or equal to 0.2 mass % and less than or equal to 1.0 mass %, and more preferably greater than or equal to 0.3 mass % and less than or equal to 0.5 mass %. The SWCNTs have a diameter of greater than or equal to 0.4 nm and less than or equal to 5.0 nm, and a length of greater than or equal to 5.0 μm and less than or equal to 20 μm, for example.

A 3% aqueous solution of the CMC has a viscosity at 100 $s^{-1}$ of greater than or equal to 2 mPa·s and less than or equal to 200 mPa·s. The viscosity at 100 $s^{-1}$ may be determined by: dissolving the CMC in water to produce the 3% aqueous solution; and measuring a viscosity of this aqueous solution at 25° C. within greater than or equal to 0.1 $s^{-1}$ and less than or equal to 1000 $s^{-1}$ using a rheometer. As the rheometer, MCR102, manufactured by Anton Paar GmbH, may be used, for example. A viscosity of the dispersion of carbon nanotubes for an electrode slurry, described later, may also be measured as in the above.

A content of the CMC in the dispersion of carbon nanotubes for an electrode slurry is greater than or equal to 50 parts by mass and less than or equal to 250 parts by mass, preferably greater than or equal to 100 parts by mass and less than or equal to 200 parts by mass, and more preferably greater than or equal to 120 parts by mass and less than or equal to 180 parts by mass, relative to 100 parts by mass of the SWCNTs.

The viscosity at 100 $s^{-1}$ of the dispersion of carbon nanotubes for an electrode slurry is, in a state of dispersing the SWCNTs, greater than or equal to 50 mPa·s and less than or equal to 200 mPa·s, preferably greater than or equal to 60 mPa·s and less than or equal to 180 mPa·s, and more preferably greater than or equal to 70 mPa·s and less than or equal to 150 mPa·s.

The particle size distribution of the dispersion of carbon nanotubes for an electrode slurry by a laser diffraction method has, in a state of dispersing the single-wall carbon nanotubes (SWCNTs), a D10 of greater than or equal to 0.3 μm and less than or equal to 1.0 μm, a D50 of greater than or equal to 3 μm and less than or equal to 10 μm, and a D90 of less than or equal to 60 μm. The D90 is, for example, greater than or equal to 20 μm. The D10, the D50, and the D90 mean particle sizes at which a cumulative frequency is respectively 10%, 50%, or 90% from a smaller particle size side in a particle size distribution on a volumetric basis. The particle size distribution of the dispersion of carbon nanotubes for an electrode slurry may be measured by using a laser diffraction-type particle size distribution measuring device (for example, MT3000II, manufactured by MicrotracBEL Corp.)

[Method for Manufacturing Dispersion of Carbon Nanotubes for Electrode Slurry]

The method for manufacturing a dispersion of carbon nanotubes for an electrode slurry includes: a mixing step of mixing greater than or equal to 0.1 mass % and less than or equal to 1.5 mass % of single-wall carbon nanotubes (SWCNTs), a dispersion medium, and a carboxymethylcellulose (CMC) in which a 3% aqueous solution thereof has a viscosity at 100 $s^{-1}$ of greater than or equal to 2 mPa·s and less than or equal to 200 mPa·s to produce a mixture liquid; and a dispersing step of dispersing the SWCNTs included in the mixture liquid. An average length of the SWCNTs mixed in the mixing step is, for example, greater than or equal to 0.1 μm and less than or equal to 200 μm.

In the mixing step, the CMC is adsorbed on the SWCNTs by using, for example, an inline mixer to produce the mixture liquid. Adsorbing the CMC on the SWCNTs may inhibit reaggregation of the SWCNTs. As the inline mixer, magic LAB, manufactured by IKA-Werke GmbH & CO. KG, may be used, for example.

In the dispersing step, a high-pressure homogenizer is used. This may disentangle and disperse the SWCNTs included in the mixture liquid to produce the dispersion of carbon nanotubes for an electrode slurry. The high-pressure homogenizer may efficiently disentangle and disperse the SWCNTs compared with a bead mill or an ultrasonic dispersing apparatus. As the high-pressure homogenizer, both of valve-type and nozzle-type homogenizers may be used, or a nozzle-valve-composite type homogenizer may also be used. Since clogging is hardly caused compared with the nozzle-type, the valve-type homogenizer is preferable. As the valve-type high-pressure homogenizer, ECONIZER LABO-02, manufactured by SANMARU MACHINERY CO., LTD., may be used, for example. With the high-pressure homogenizer, regulating a flow rate, pressure, and the like may change the dispersion state of the SWCNTs. Passing the mixture liquid through the high-pressure homogenizer a plurality of times may improve the dispersibility of the SWCNTs. Here, improvement of the dispersibility of the SWCNTs means that the particle distribution of the single-wall carbon nanotubes (SWCNTs) satisfies the range of the D10 of greater than or equal to 0.3 µm and less than or equal to 1.0 µm, the D50 of greater than or equal to 3 µm and less than or equal to 10 µm, and the D90 of less than or equal to 60 µm. Note that, if the number of times of passing the mixture liquid through the high-pressure homogenizer is too large, the dispersibility of the SWCNTs is deteriorated. That is, any one or more of the D10, the D50, and the D90 may be out of the above range.

Example 1

Hereinafter, the present disclosure will be further described with Examples, but the present disclosure is not limited to these Examples.

Example 1

[Production of Dispersion of Carbon Nanotubes for Electrode Slurry]

By using an inline mixer (magic LAB, IKA), single-wall carbon nanotubes (SWCNTs) having a diameter of 1.6 nm and an average length of 15 µm, a carboxymethylcellulose (CMC) in which a 3% aqueous solution thereof had a viscosity at $100\ s^{-1}$ of 6.7 mPa·s, and water were mixed at a mass ratio of 0.4:0.6:99 to produce a mixture liquid (the mixing step). Then, this mixture liquid was treated by using a valve-type high-pressure homogenizer (ECONIZER LABO-02, SANMARU MACHINERY CO., LTD.) five times at a flow rate of 14 L/h and a pressure of 80 Pa to produce a dispersion of carbon nanotubes for an electrode slurry (the dispersing step). This dispersion of carbon nanotubes for an electrode slurry had a viscosity, in a state of dispersing the SWCNTs, at $100\ s^{-1}$ of 114.5 mPa·s, and a particle size distribution by a laser diffraction method of a D10 of 0.982 µm, a D50 of 8.78 µm, and a D90 of 54.93 µm.

[Production of Negative Electrode Slurry]

A mixture of graphite, SiO, and LSX at a mass ratio of 95:3:2 was used as a negative electrode active material. Mixing the negative electrode active material, the dispersion of carbon nanotubes for an electrode slurry, CMC, lithium polyacrylate, and styrene-butadiene rubber (SBR) were mixed so that a solid content mass ratio thereof was 100:0.02:1:1:0.4 to prepare a negative electrode slurry.

[Production of Negative Electrode]

The negative electrode slurry was applied on both surfaces of a negative electrode core made of copper foil by a die-coating method, the coating was dried, then rolled with a roller, and cut to a predetermined electrode size to produce a negative electrode. On the negative electrode, a negative electrode core exposed portion for connecting a negative electrode lead was provided at one end in a width direction.

[Production of Positive Electrode]

An NCA (Ni—Al—Co)-based lithium-transition metal composite oxide containing 88 mass % of Ni was used as a positive electrode active material. Prepared was a dispersion of carbon nanotubes for a positive electrode slurry including multiwall carbon nanotubes (MWCNTs), polyvinylpyrrolidone (PVP), and N-methyl-2-pyrrolidone (NMP). In NMP, the positive electrode active material, the dispersion of carbon nanotubes for a positive electrode slurry, and polyvinylidene fluoride (PVdF) were mixed so that a solid content mass ratio thereof was 100:0.4:0.8 to prepare a positive electrode slurry. Then, this positive electrode slurry was applied on both surfaces of a positive electrode core made of aluminum foil by a die-coating method, the coating was dried, then rolled with a roller, and cut to a predetermined electrode size to produce a positive electrode. On the positive electrode, a positive electrode core exposed portion for connecting a positive electrode lead was provided at one end in a width direction.

[Preparation of Non-Aqueous Electrolyte]

Ethylene carbonate (EC), ethyl methyl carbonate (EMC), and dimethyl carbonate (DMC) were mixed at a volume ratio of 3:3:4. Into this mixed solvent, lithium hexafluorophosphate ($LiPF_6$) was dissolved so that the concentration was 1.2 mol/L to prepare a non-aqueous electrolyte.

[Production of Test Cell]

A positive electrode lead was attached to the exposed portion of the positive electrode, and a negative electrode lead was attached to the exposed portion of the negative electrode. The positive electrode and the negative electrode were spirally wound with a separator made of a polyolefin interposed therebetween, and then press-formed in a radial direction to produce a flat, wound electrode assembly. This electrode assembly was housed in an exterior constituted with an aluminum laminated sheet, the non-aqueous electrolyte was injected thereinto, and then an opening of the exterior was sealed to obtain a test cell (battery capacity: 400 mAh).

[Evaluation of Capacity Retention]

The following cycle test was performed on the test cell. A discharge capacity at the 1st cycle and a discharge capacity at the 200th cycle of the cycle test were determined, and a capacity retention was calculated by the following formula.

Capacity Retention (%)=(Discharge Capacity at 200th Cycle/Discharge Capacity at 1st Cycle)× 100

<Cycle Test>

In a temperature environment at 25° C., the test cell was charged at a constant current of 0.5 C until a battery voltage reached 4.2 V, charged at a constant voltage of 4.2 V until a current value reached 0.05 C, and then discharged at a constant current of 0.7 C until the battery voltage reached 2.5 V. This was specified as one cycle. With an interval for 10 minutes after each cycle was finished, 200 cycles were repeated in this cycle test.

Example 2

A test cell was produced, measured, and evaluated in the same manner as in Example 1 except that, in the dispersing step in the production of the dispersion of carbon nanotubes for an electrode slurry, the number of treatments was changed to 10.

Example 3

A test cell was produced, measured, and evaluated in the same manner as in Example 1 except that, in the dispersing step in the production of the dispersion of carbon nanotubes for an electrode slurry, the number of treatments was changed to 40.

Example 4

A test cell was produced, measured, and evaluated in the same manner as in Example 1 except that, in the dispersing step in the production of the dispersion of carbon nanotubes for an electrode slurry, the number of treatments was changed to 80.

Example 5

A test cell was produced, measured, and evaluated in the same manner as in Example 2 except that, in the production of the dispersion of carbon nanotubes for an electrode slurry, the CMC was changed to those in which a 3% aqueous solution thereof had a viscosity at 100 $s^{-1}$ of 21.4 mPa·s.

Comparative Example 1

A test cell was produced, measured, and evaluated in the same manner as in Example 2 except that, in the production of the dispersion of carbon nanotubes for an electrode slurry, the CMC was changed to those in which a 3% aqueous solution thereof had a viscosity at 100 $s^{-1}$ of 901 mPa·s.

Comparative Example 2

A test cell was produced, measured, and evaluated in the same manner as in Example 2 except that, in the production of the dispersion of carbon nanotubes for an electrode slurry, the CMC was changed to those in which a 3% aqueous solution thereof had a viscosity at 100 $s^{-1}$ of 1615 mPa·s.

Comparative Example 3

A test cell was produced, measured, and evaluated in the same manner as in Example 1 except that, in the dispersing step in the production of the dispersion of carbon nanotubes for an electrode slurry, the number of treatments was changed to 120.

Comparative Example 4

A test cell was produced, measured, and evaluated in the same manner as in Example 1 except that, in the dispersing step in the production of the dispersion of carbon nanotubes for an electrode slurry, the number of treatments was changed to 150.

Comparative Example 5

A test cell was produced, measured, and evaluated in the same manner as in Example 2 except that, in the dispersing step in the production of the dispersion of carbon nanotubes for an electrode slurry, the dispersion was treated by using a bead mill (DYNO MILL, manufactured by Willy A. Bachofen AG) with a setting of a bead diameter of 0.65 μm and a disk peripheral speed of 14 m/s at the same flow rate (14 L/h) and by the same number of times (10 times) as in Example 2.

Comparative Example 6

A test cell was produced, measured, and evaluated in the same manner as in Example 2 except that, in the dispersing step in the production of the dispersion of carbon nanotubes for an electrode slurry, the dispersion was treated by using an ultrasonic dispersing apparatus (GSD600RAT, manufactured by Sonic Technology Co., Ltd.) with a setting of an output of 600 W at the same flow rate (14 L/h) and by the same number of times (10 times) as in Example 2.

Table 1 describes the evaluation results of the capacity retentions in Examples and Comparative Examples. The capacity retentions in Examples 2 to 6 and Comparative Examples 1 to 6 are shown as values relative to the capacity retention in Example 1 being 100. Table 1 also describes: the viscosity and concentration of the CMC and concentration of the CNTs included in the dispersion of carbon nanotubes for an electrode slurry; the apparatus used in the dispersing step; the viscosity of the dispersion of carbon nanotubes for an electrode slurry; and the particle size distribution of the SWCNTs in the dispersion of carbon nanotubes for an electrode slurry.

TABLE 1

| | Dispersion of carbon nanotubes for electrode slurry | | | | | | | | |
|---|---|---|---|---|---|---|---|---|---|
| | Raw materials | | | | Particle size distribution [μm] | | | | Evaluation result |
| | CMC | | SWCNT | | | | | | |
| | Viscosity [mPa·s] | Concentration [mass %] | Concentration [mass %] | Dispersing apparatus | D10 | D50 | D90 | Viscosity [mPa·s] | Capacity retention |
| Example 1 | 6.7 | 0.6 | 0.4 | High-pressure homogenizer | 0.982 | 8.78 | 54.93 | 114.5 | 100 |
| Example 2 | 6.7 | 0.6 | 0.4 | High-pressure homogenizer | 0.354 | 6.56 | 34.09 | 89.7 | 100.2 |
| Example 3 | 6.7 | 0.6 | 0.4 | High-pressure homogenizer | 0.326 | 6.37 | 21.28 | 81.0 | 99.2 |
| Example 4 | 6.7 | 0.6 | 0.4 | High-pressure homogenizer | 0.469 | 9.43 | 56.98 | 72.5 | 99.7 |
| Example 5 | 21.4 | 0.6 | 0.4 | High-pressure homogenizer | 0.616 | 4.54 | 57.79 | 144.1 | 100.1 |
| Comparative Example 1 | 901 | 0.6 | 0.4 | High-pressure homogenizer | 5.261 | 16.85 | 64.96 | 317.5 | 98.0 |
| Comparative Example 2 | 1615 | 0.6 | 0,4 | High-pressure homogenizer | 4.988 | 15.86 | 69.45 | 435.2 | 97.5 |
| Comparative Example 3 | 6.7 | 0.6 | 0,4 | High-pressure homogenizer | 0.348 | 3.31 | 49.16 | 49.2 | 97.9 |

TABLE 1-continued

Dispersion of carbon nanotubes for electrode slurry

| | Raw materials | | | Particle size distribution [μm] | | | | Evaluation result |
|---|---|---|---|---|---|---|---|---|
| | CMC | | SWCNT | | | | | |
| | Viscosity [mPa·s] | Concentration [mass %] | Concentration [mass %] | Dispersing apparatus | D10 | D50 | D90 | Viscosity [mPa·s] | Capacity retention |
| Comparative Example 4 | 6.7 | 0.6 | 0.4 | High-pressure homogenizer | 0.353 | 1.02 | 3.71 | 29.4 | 97.4 |
| Comparative Example 5 | 6.7 | 0.6 | 0.4 | Bead mill | 3.684 | 9.43 | 21.17 | 232.3 | 98.0 |
| Comparative Example 6 | 6.7 | 0.6 | 0.4 | Ultrasonic dispersing apparatus | 6.488 | 16.39 | 59.03 | 77.6 | 97.9 |

The test cells of Examples 1 to 5 all have the negative electrode produced by using the dispersion of carbon nanotubes for an electrode slurry satisfying the predetermined conditions. This may improve the charge-discharge cycle characteristics of the test cells of Examples 1 to 5 compared with the test cells of Comparative Examples 1 to 6.

REFERENCE SIGNS LIST

10 Electrode, 11 Core, 12 Electrode mixture layer

The invention claimed is:

1. A dispersion of carbon nanotubes for an electrode slurry, including:
    greater than or equal to 0.1 mass % and less than or equal to 1.5 mass % of carbon nanotubes;
    a dispersion medium; and
    a carboxymethylcellulose in which a 3% aqueous solution thereof has a viscosity at $100\ s^{-1}$ of greater than or equal to 2 mPa·s and less than or equal to 200 mPa·s, wherein
    a content of the carboxymethylcellulose is greater than or equal to 50 parts by mass and less than or equal to 250 parts by mass relative to 100 parts by mass of the carbon nanotubes,
    in a state of dispersing the carbon nanotubes, a viscosity at $100\ s^{-1}$ is greater than or equal to 50 mPa·s and less than or equal to 200 mPa·s, and
    in a state of dispersing the carbon nanotubes, a particle size distribution by a laser diffraction method has a D10 of greater than or equal to 0.3 μm and less than or equal to 1.0 μm, a D50 of greater than or equal to 3 μm and less than or equal to 10 μm, and a D90 of less than or equal to 60 μm.

2. A negative electrode slurry, including:
    the dispersion of carbon nanotubes for an electrode slurry according to claim 1;
    a carbon-based negative electrode active material; and
    a Si-based negative electrode active material.

3. A non-aqueous electrolyte secondary battery, comprising a negative electrode produced by using the negative electrode slurry according to claim 2.

4. A method for manufacturing a dispersion of carbon nanotubes for an electrode slurry, including:
    a mixing step of mixing greater than or equal to 0.1 mass % and less than or equal to 1.5 mass % of carbon nanotubes, a dispersion medium, and a carboxymethylcellulose in which a 3% aqueous solution thereof has a viscosity at $100\ s^{-1}$ of greater than or equal to 2 mPa·s and less than or equal to 200 mPa·s to produce a mixture liquid; and
    a dispersing step of dispersing the carbon nanotubes included in the mixture liquid so as to reach a state of dispersing the carbon nanotubes, wherein
    in said state of dispersing the carbon nanotubes:
    a viscosity at $100\ s^{-1}$ is greater than or equal to 50 mPa·s and less than or equal to 200 mPa·s, and
    a particle size distribution by a laser diffraction method has a D10 of greater than or equal to 0.3 μm and less than or equal to 1.0 μm, a D50 of greater than or equal to 3 μm and less than or equal to 10 μm, and a D90 of less than or equal to 60 μm.

5. The method for manufacturing a dispersion of carbon nanotubes for an electrode slurry according to claim 4, wherein
    a content of the carboxymethylcellulose is greater than or equal to 50 parts by mass and less than or equal to 250 parts by mass relative to 100 parts by mass of the carbon nanotubes.

* * * * *